(12) United States Patent
Henry et al.

(10) Patent No.: US 6,200,212 B1
(45) Date of Patent: Mar. 13, 2001

(54) FISH CLEANING, BAIT STATION, AND LIVE WELL DEVICE

(76) Inventors: Eldon L. Henry, 10990 Union Hill Rd., Sonora, CA (US) 95370; Kenneth D. Henry, 802 Timber Ridge Rd., Lake Almanor, CA (US) 96137

( * ) Notice: Subject to any disclaimer, the term of this patent is extended or adjusted under 35 U.S.C. 154(b) by 0 days.

(21) Appl. No.: 09/499,429

(22) Filed: Feb. 7, 2000

(51) Int. Cl.[7] .................................................. A22C 25/06
(52) U.S. Cl. ................................ 452/194; 452/195; 43/56
(58) Field of Search ................................... 452/185, 194, 452/195, 196; 43/56

(56) References Cited

U.S. PATENT DOCUMENTS

| Re. 35,895 | 10/1998 | Bass ..................... 119/203 |
| D. 300,197 | 3/1989 | Tingle ..................... D7/46 |
| D. 306,695 | 3/1990 | Stiggers et al. ..................... D7/695 |
| D. 307,365 | 4/1990 | Dry et al. ..................... D6/429 |
| D. 308,792 | 6/1990 | Lord et al. ..................... D7/698 |
| D. 352,427 | 11/1994 | Burd ..................... D7/698 |
| D. 366,400 | 1/1996 | Dentsbier ..................... D7/698 |
| D. 368,415 | 4/1996 | Adams et al. ..................... D7/698 |
| D. 375,877 | 11/1996 | Dotson et al. ..................... D7/698 |
| D. 414,249 | 9/1999 | Welch ..................... D23/284 |
| 3,561,043 * | 2/1971 | Breckenridge et al. ..................... 452/194 |
| 3,590,423 * | 7/1971 | Messer ..................... 452/194 |
| 3,668,739 * | 6/1972 | Lewis ..................... 452/194 |
| 3,785,008 * | 1/1974 | Parker ..................... 452/195 |
| 4,062,299 | 12/1977 | Smith ..................... 108/42 |
| 4,226,004 | 10/1980 | Zimmerman et al. . |
| 4,229,858 * | 10/1980 | Baxter et al. ..................... 452/194 |
| 4,271,624 * | 6/1981 | Peluso ..................... 452/185 |
| 4,332,057 | 6/1982 | Smith . |
| 4,356,596 | 11/1982 | Gunderson et al. . |
| 4,454,628 * | 6/1984 | Olson ..................... 452/194 |
| 4,454,630 | 6/1984 | Shouldis . |
| 4,535,509 | 8/1985 | Bullock et al. . |
| 4,563,793 | 1/1986 | Ryan . |
| 4,625,364 | 12/1986 | Adams . |
| 4,627,189 | 12/1986 | Pippin et al. ..................... 43/55 |
| 4,686,788 | 8/1987 | Hartman ..................... 43/56 |
| 4,697,380 | 10/1987 | Fenske ..................... 43/55 |
| 4,715,276 | 12/1987 | Saalasti ..................... 100/121 |
| 4,766,621 | 8/1988 | Rasor ..................... 4/643 |
| 4,787,169 | 11/1988 | Maxfield et al. ..................... 43/57 |
| 4,790,097 | 12/1988 | Blackiston ..................... 43/4 |
| 4,790,964 | 12/1988 | Swanson ..................... 261/121.2 |
| 4,793,027 | 12/1988 | Blight . |
| 4,794,670 * | 1/1989 | Savastano, Jr. ..................... 452/185 |

(List continued on next page.)

OTHER PUBLICATIONS

West Marine Master Catalog 1998 – Fish Cleaner – p. 177 – Model 331126.
Cabelas Online Store – Fillet Factory Fish Cleaning Table – Item IK–01–3500.

* cited by examiner

Primary Examiner—Willis Little

(57) ABSTRACT

A compact 3 in 1 device used for fish cleaning, bait cutting, and/or live well. It can be easily attached to the gunwale of a boat with adjustable mounting arms. The arms are adjustable for both the width and depth of the gunwale and will fit most boats. This device includes a cutting board, clamp device to hold fish while cleaning and a knife and pliers holder. A "V" shaped tank which can be used to transport live bait, hold fish to be cleaned and/or fish already cleaned. The tank is equipped with an overflow tube with a screen attached to the top to prevent the loss of live bait. Removing the tube allows the tank to be drained. A 12 volt submersible pump is placed into the lake or reservoir and is attached to a 3 way brass ball valve. The 3 way brass ball valve will direct water to either the live well tank or the wash down hose. The electrical cord is plugged into an existing cigarette lighter on a boat or equipped with alligator clips to attach to a 12 volt battery. A inline switch and inline fuse is located withing the 10 foot electrical cord.

9 Claims, 11 Drawing Sheets

U.S. PATENT DOCUMENTS

| | | |
|---|---|---|
| 4,815,169 | 3/1989 | Vallean . |
| 4,815,411 | 3/1989 | Burgess ................. 114/255 |
| 4,825,577 | 5/1989 | Brannon ................. 43/55 |
| 4,833,999 | 5/1989 | Rhoades ................. 108/38 |
| 4,839,942 | 6/1989 | Damp . |
| 4,846,076 | 7/1989 | Menges et al. ................. 108/42 |
| 4,854,626 | 8/1989 | Duke ................. 294/19.1 |
| 4,862,634 | 9/1989 | Surface ................. 43/55 |
| 4,882,811 | 11/1989 | Ewing . |
| 4,887,380 | 12/1989 | Andrews ................. 43/55 |
| 4,913,620 | 4/1990 | Kuisiak et al. ................. 415/211.1 |
| 4,930,188 | 6/1990 | Hyde . |
| 4,935,991 | 6/1990 | Tourney . |
| 4,945,672 | 8/1990 | Raia ................. 43/57 |
| 4,951,355 | 8/1990 | Pack . |
| 4,970,982 | 11/1990 | Martin ................. 114/255 |
| 4,976,010 | 12/1990 | Lavelle ................. 452/116 |
| 4,977,643 | 12/1990 | Prysock ................. 452/187 |
| 4,977,644 | 12/1990 | Evans et al. ................. 452/195 |
| 5,098,338 | 3/1992 | Jensen ................. 452/194 |
| 5,109,625 | 5/1992 | Skrede ................. 43/56 |
| 5,129,855 | 7/1992 | Bruckert et al. ................. 452/99 |
| 5,134,801 | 8/1992 | Davey ................. 43/42.28 |
| 5,138,975 | 8/1992 | Walsh ................. 119/3 |
| 5,166,279 | 5/1992 | Perry ................. 452/195 |
| 5,191,732 | 3/1993 | Berdinsky et al. ................. 43/55 |
| 5,230,652 | 7/1993 | Alam ................. 452/98 |
| 5,231,789 | 8/1993 | Radmanovich ................. 43/57 |
| 5,241,365 | 8/1993 | Haagensen ................. 356/376 |
| 5,301,859 | 4/1994 | Brummel ................. 224/103 |
| 5,318,472 | 6/1994 | Johnson ................. 452/99 |
| 5,339,129 | 8/1994 | Frith ................. 452/187 |
| 5,352,152 | 10/1994 | Claudon ................. 452/127 |
| 5,355,617 | 10/1994 | Maynard ................. 43/56 |
| 5,372,084 | 12/1994 | Malloory ................. 114/255 |
| 5,377,445 | 1/1995 | Brannon ................. 43/55 |
| 5,394,639 | 3/1995 | Tentler ................. 43/56 |
| 5,406,740 | 4/1995 | Wilken ................. 43/56 |
| 5,474,494 | 12/1995 | Sims ................. 452/194 |
| 5,556,069 | 9/1996 | Malmberg ................. 248/291.1 |
| 5,575,521 | 11/1996 | Speis ................. 296/57.1 |
| 5,586,406 | 12/1996 | Lin et al. ................. 43/55 |
| 5,609,521 | 3/1997 | Allred et al. ................. 452/194 |
| 5,628,680 | 5/1997 | Hjorth ................. 452/106 |
| 5,628,681 | 5/1997 | White et al. ................. 452/194 |
| 5,632,220 * | 5/1997 | Vento ................. 114/255 |
| 5,634,291 | 6/1997 | Pham ................. 43/57 |
| 5,636,469 | 6/1997 | Pizzolo et al. ................. 43/654.1 |
| 5,799,435 | 9/1998 | Stafford ................. 43/57 |
| 5,813,904 | 9/1998 | Aslanis et al. ................. 452/133 |
| 5,822,916 | 10/1998 | Power ................. 43/57 |
| 5,833,526 | 11/1998 | Berry ................. 452/132 |
| 5,921,017 | 7/1999 | Clark et al. ................. 43/57 |
| 5,944,596 | 8/1999 | Hargrove ................. 452/105 |

FISH CLEANING, BAIT STATION, AND LIVE WELL DEVICE

BACKGROUND

1. Field of Invention

This device is a portable boat mounted device used to clean fish, cut fish bait or to transport live bait such as minnows.

2. Description of Prior Art

Many fish cleaning, bait station, and live well devices have been known for many years in prior art. U.S. Pat. No. 4,229,858 shows a boat mounted fish cleaning tray with a leg mounted to the floor of the boat. U.S. Pat. No. 5,098,338 is a portable fish cleaning station mounted to the outside of the gunwale of the boat. A portable bucket and seat apparatus which could be used on a boat is shown in U.S. Pat. No. 4,846,076. U.S. Pat. No. 4,794,670 is used as a fish chunk-cutting device.

Most of the prior art for fish cleaning devices were not for use on a boat. Those fish cleaning devices that were designed for a boat required a bracket, flange or other device to be connected to the boat, in some cases this could create a tripping hazard. Further, none of the devices were found to have running water available during the cleaning process while on a boat. Most of the forgoing devices were singular in use, that is they were for fish cleaning only while some could be used as dual purpose by including a bait cutting device.

SUMMARY INCLUDING OBJECTS AND ADVANTAGES

The advantages of the present device, briefly described here are many. This device provides a boat mounted fish cleaning device with a flat surface top for cleaning fish and cutting bait. A "V" shaped tank below the top is designed for holding live bait. The adjustable mounting arms allows this invention to be mounted to the gunwale of most boats. A centrifugal pump assembly attached to one end of the tank provides fresh water from a lake or reservoir for cleaning and/or filling the live well.

The above description is a broad overview of the major features of this device. There are additional features of the device which will be discussed in further detail and will form the subject matter of the claims which are appended to this document.

Before explaining the present device in detail, it is to be understood that the device is not limited in its application to the details of the construction and the arrangements of the components set forth in the following description or illustrated in the drawings. Also, it is to be understood that the phraseology and terminology employed herein are for the purpose of description and should not be regarded as limiting.

OBJECTS AND ADVANTAGES

The main advantage is that this device is a 3 in 1 combination device which can be easily installed or carried on almost all boats. This device is a portable boat mounted device for cleaning fish with running water. This device allows a fisherman to clean their fish shortly after catching them. This device attaches to a boat without any invasive device such as screws, bolts or brackets leaving the integrity of the boat intact. The device is a convenient and safe place to store a knife and pliers while cleaning fish. It is a convient place to hold a garbage bag to place fish entrails. Another advantage to this device is that it is lightweight and very durable based on the type of materials the preferred embodiment.

The second part of the 3 in 1 device is used for a bait cutting board and or a place to prepare fish bait. This device provides such a place which can be easily cleaned and keeps the boat clean.

The third part of this device is it serves as a live well allowing the user to transport live bait such as minnows. It also provides fresh water as needed for the live bait.

Still further objects and advantages will become apparent from a consideration of the ensuing description and accompanying drawings.

REFERENCE NUMERALS

10—"V" shaped tank
12—adapter 1" MIP x¾" FIP
14—"O" ring
16—1" polycarbonate plastic nut
18—overflow tube ¾" diameter
20—stainless steel window screen
22—1" stainless steel hose clamp
24—left end polycarbonate plastic
26—¼" stainless steel nut
28—⅛"x1" stainless steel flat head screw
30—upper portion of left end adjustable mounting arm
32—¼"x¾" stainless steel machine bolt
34—¼" stainless steel washer
36—lower portion of adjustable mounting arm
38—right end polycarbonate plastic
40—Polycarbonate plastic knife and pliers holder
42—polycarbonate plastic garbage bag holder
44—cutting board high density polyethylene plastic
46—⅛" stainless steel washer
48—1"x10½"x½" high density polyethylene plastic
50—1"x16"x½" high density polyethylene plastic
52—clamping device
54—⅛"x¾" round head stainless steel machine screws
56—⅛" stainless steel nut
58—⅛" stainless steel washer
60—10' electrical cord
62—cigarette lighter adapter
64—inline fuse
66—inline switch 68—12 volt submersible pump
70—½" clear vinyl hose
72—½"× slip ×½" MIP polyethylene adapter
74—½" 3 way brass ball valve
76—½" clear vinyl plastic hose
78—½" stainless steel hose clamps
80—½" close galvanized nipple
82—½" galvanized street ell

PREFERRED EMBODIMENT

Description

Figure 2:
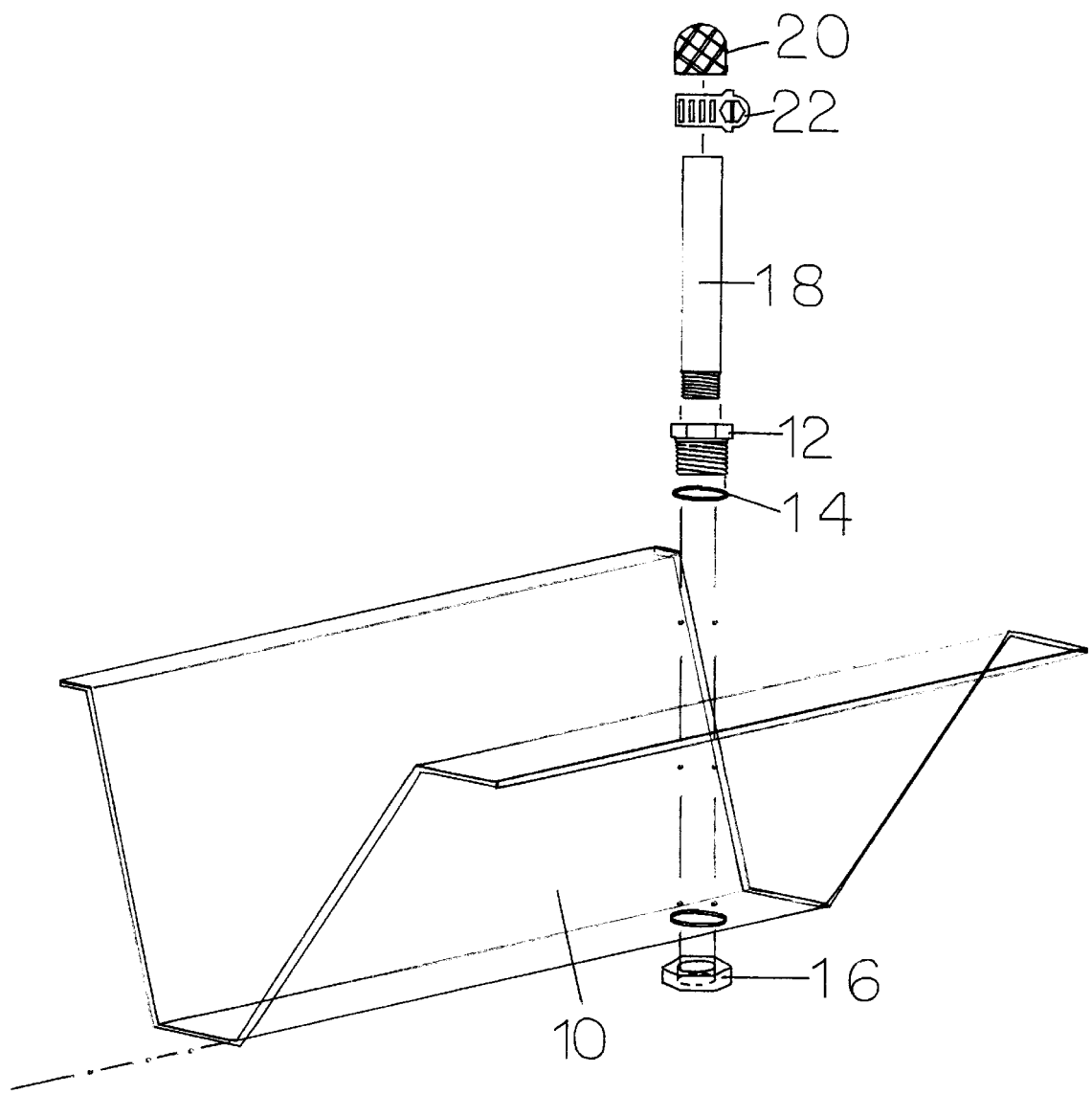
FIG. 2 is a Isometric Exploded View of Tank and Overflow Tube

The main body and frame of this device is a "V" shaped tank 10, FIG. 2. A tank is made of ⅛" polycarbonate plastic with four bends to form a flat bottom and flat lip in front and back of the "V" shaped tank 10. The tank bottom is drilled with a 1.33" hole near the right end to accept—adapter 1" MIP×¾" FIP 12, FIG. 2. A adapter 12 is fitted with a "O" ring 14, FIG. 2 before insertion into the 1.33" hole in the bottom of the "V" shaped tank. The adapter 12 is held in place with a 1" polycarbonate nut 16, FIG. 2. A overflow tube ¾" diameter 18, FIG. 2 is threaded into adapter 12. A small piece of—stainless steel window screen 20, FIG. 2 is placed over the overflow tube 18 and secured with—1" stainless steel hose clamp 22, FIG. 2.

Figure 3:
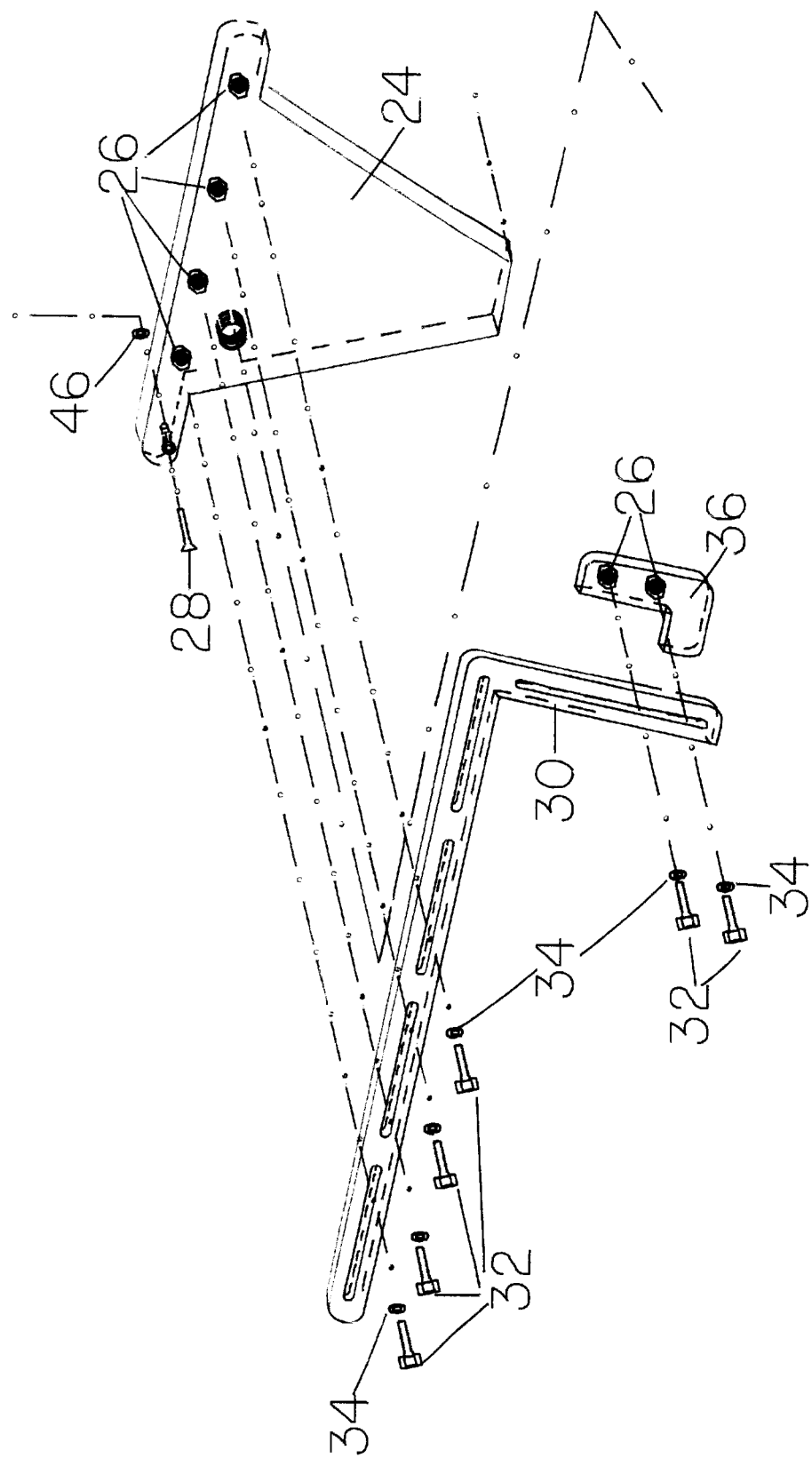
FIG. 3 is a Isometric Exploded View of Left End Assembly
Figure 6:
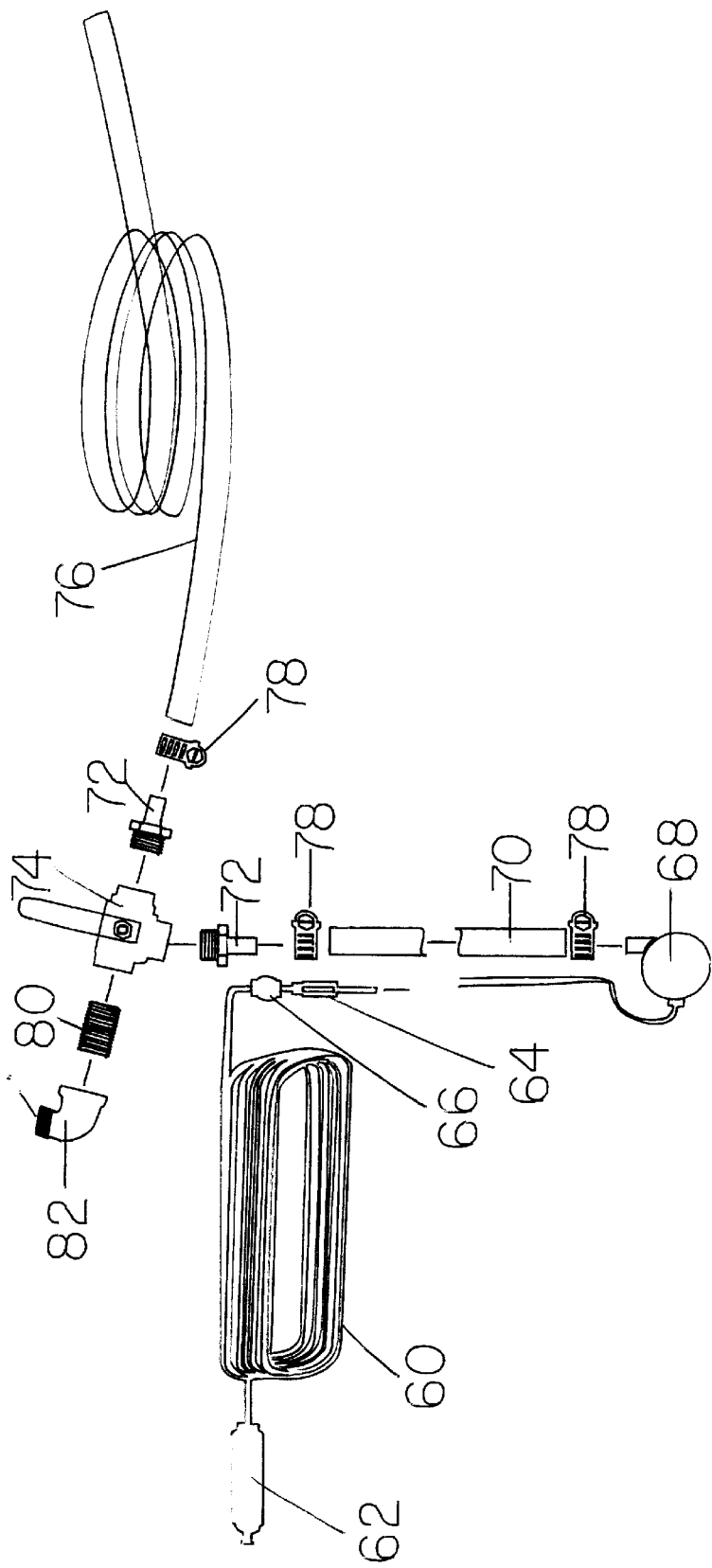
FIG. 6 is a Isometric Exploded View of Electrical, Pump and Plumbing Assembly
Figure 7:
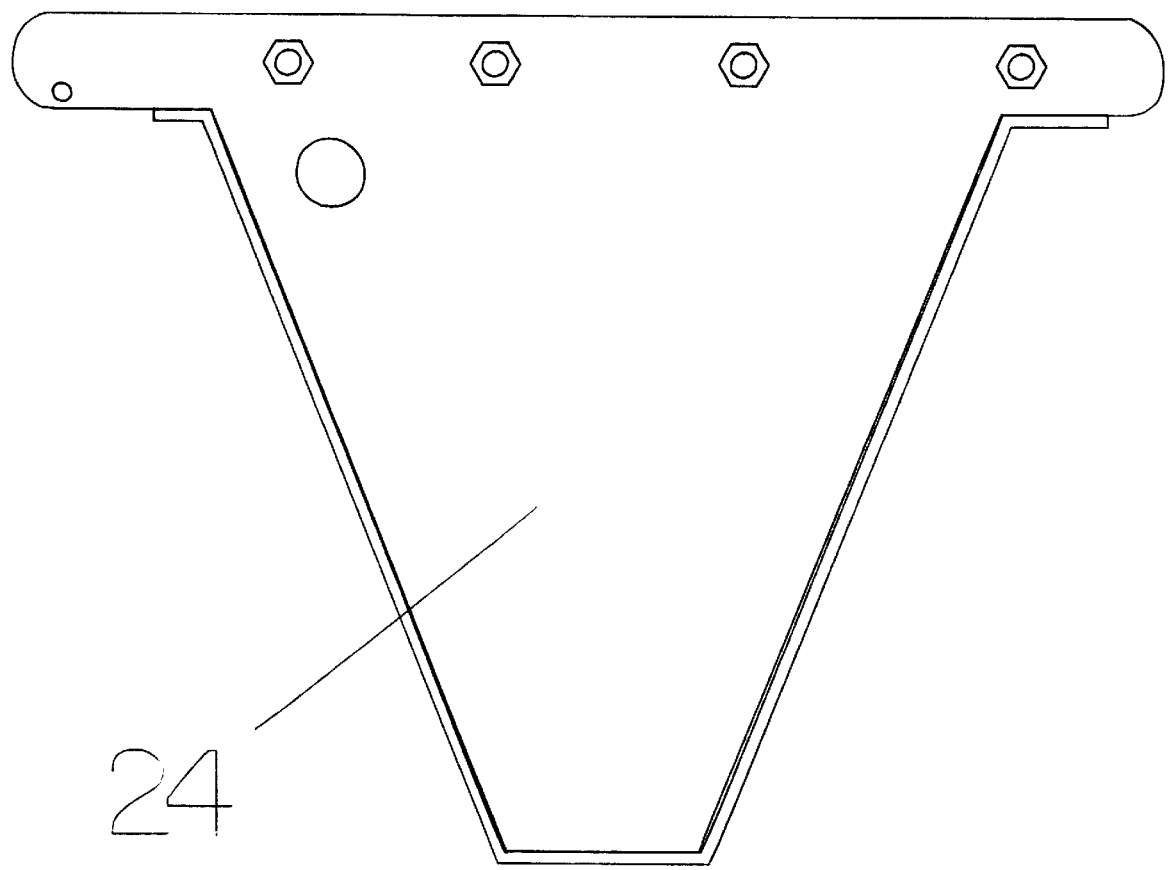
FIG. 7 is a Exploded View of Left End
Figure 8:
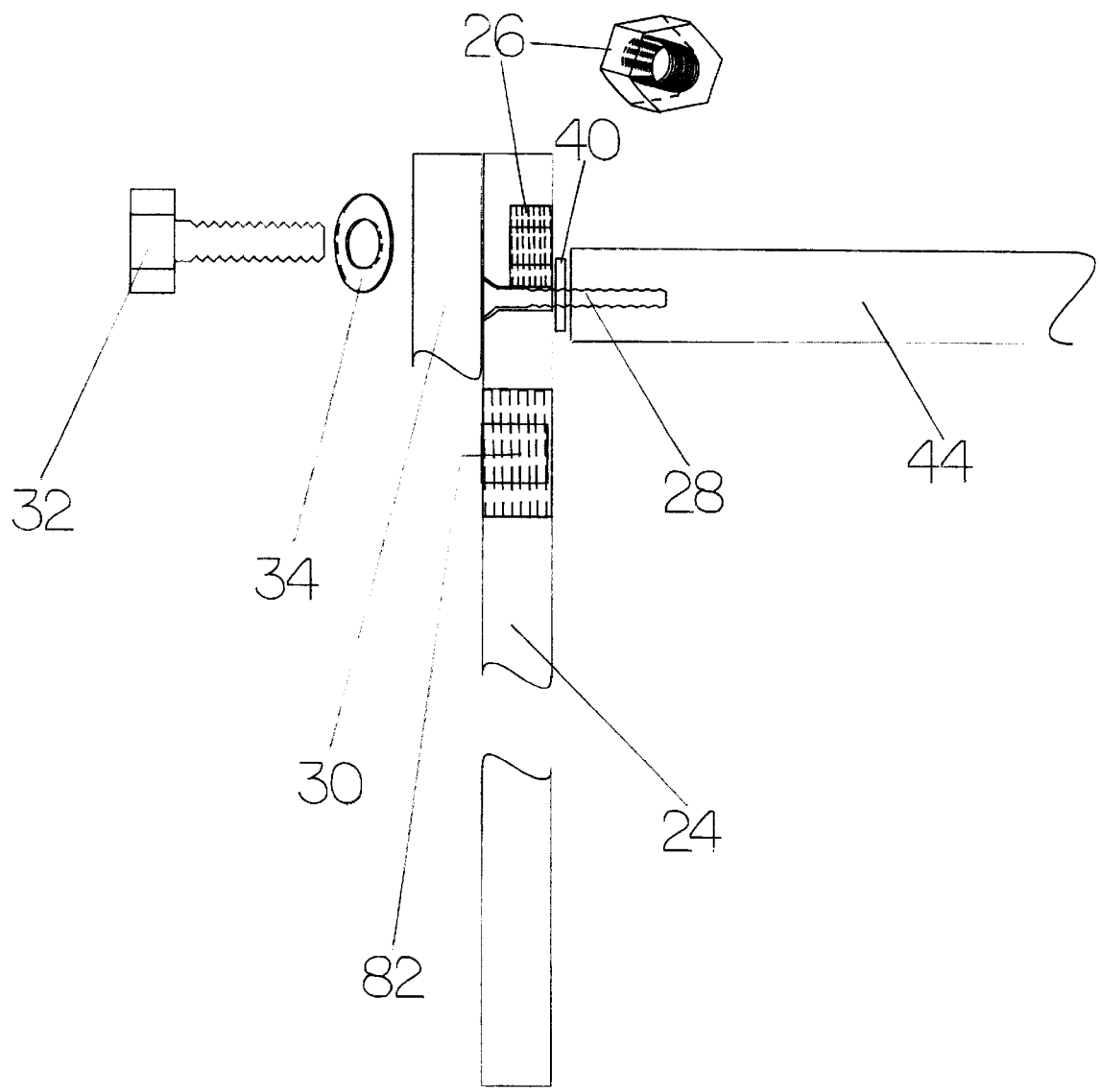
FIG. 8 is a Exploded View of Left End Assembly

A left end polycarbonate plastic 24, FIG. 3 is construced of ⅜" polycarbonate plastic is and glued to tank 10 with polycarbonate cement. FIG. 7 shows the hole location for all holes in left end plate 24. FIG. 8 shows that ¼" stainless steel nut 26 are recessed into left end polycarbonate plastic 24. FIG. 8 shows hole to accept ⅛"×1" stainless steel flat head screw 28 which is used to attach to and hold cutting board 44, FIG. 5 stainless steel flat head screw 28 and also serves as a pivot point to allow the cutting board to open as a lid. FIG. 8 also shows the hole location for threading ½" galvanized street ell 82, FIG. 6 into left end piece.

Figure 9:
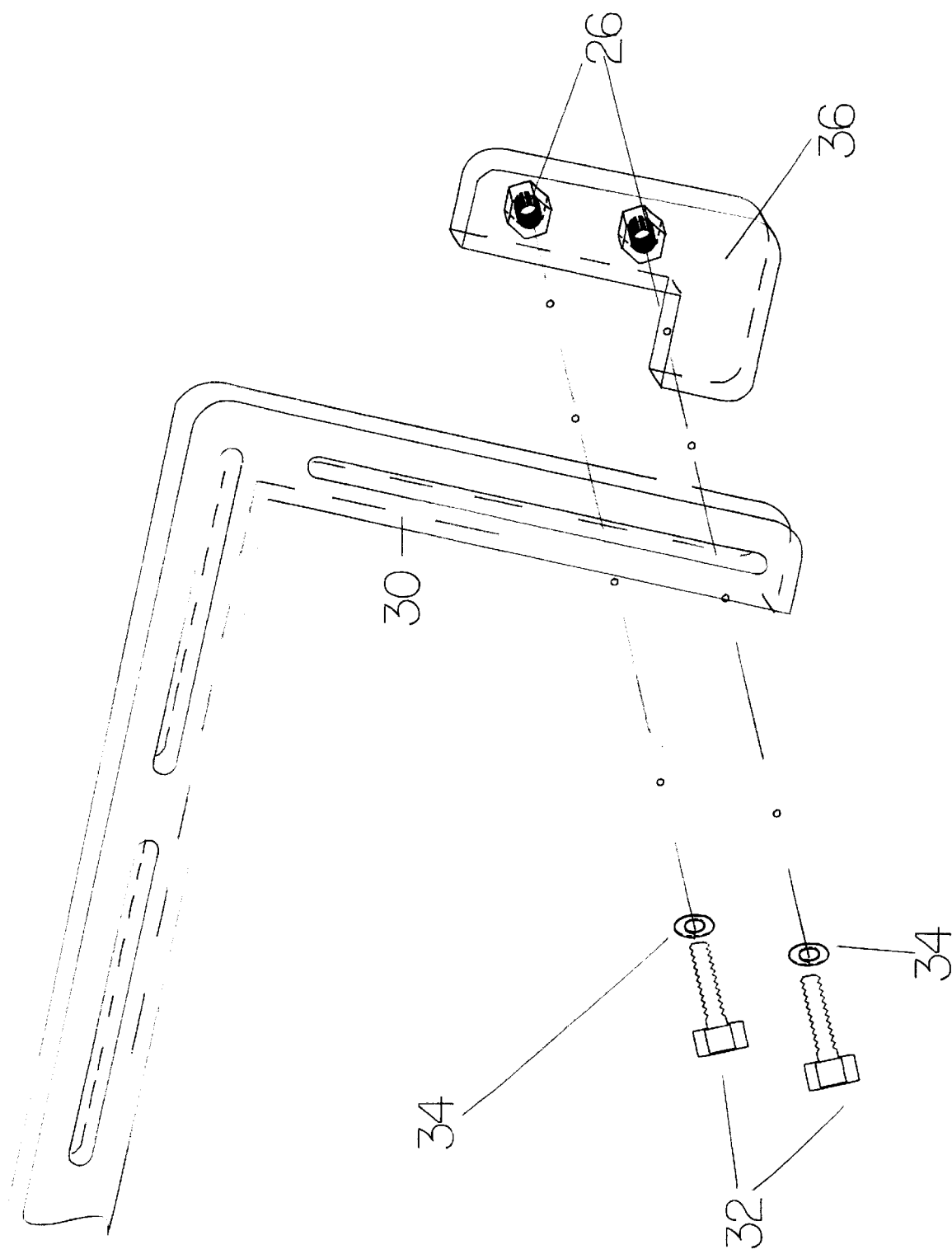
FIG. 9 is a Exploded View of Lower Portion of Adjustable Mounting Arm Assembly

Upper portion of left end adjustable mounting arm 30, FIG. 3 is attached with four ¼"×¾" stainless steel machine bolt 32, FIG. 3 to left end polycarbonate plastic 24 with four ¼" stainless steel washer 34. Lower portion of adjustable mounting arm 36, FIG. 9 is attached to upper portion of adjustable mounting arm 30 with two ¼"×¾" stainless steel machine bolts 32, and two ¼" stainless steel washer 34, FIG. 9. The ¼" stainless steel nuts 26 are recessed into lower portion of adjustable mounting arm in the same manner as those in end plate 24, FIG. 8.

Figure 1:
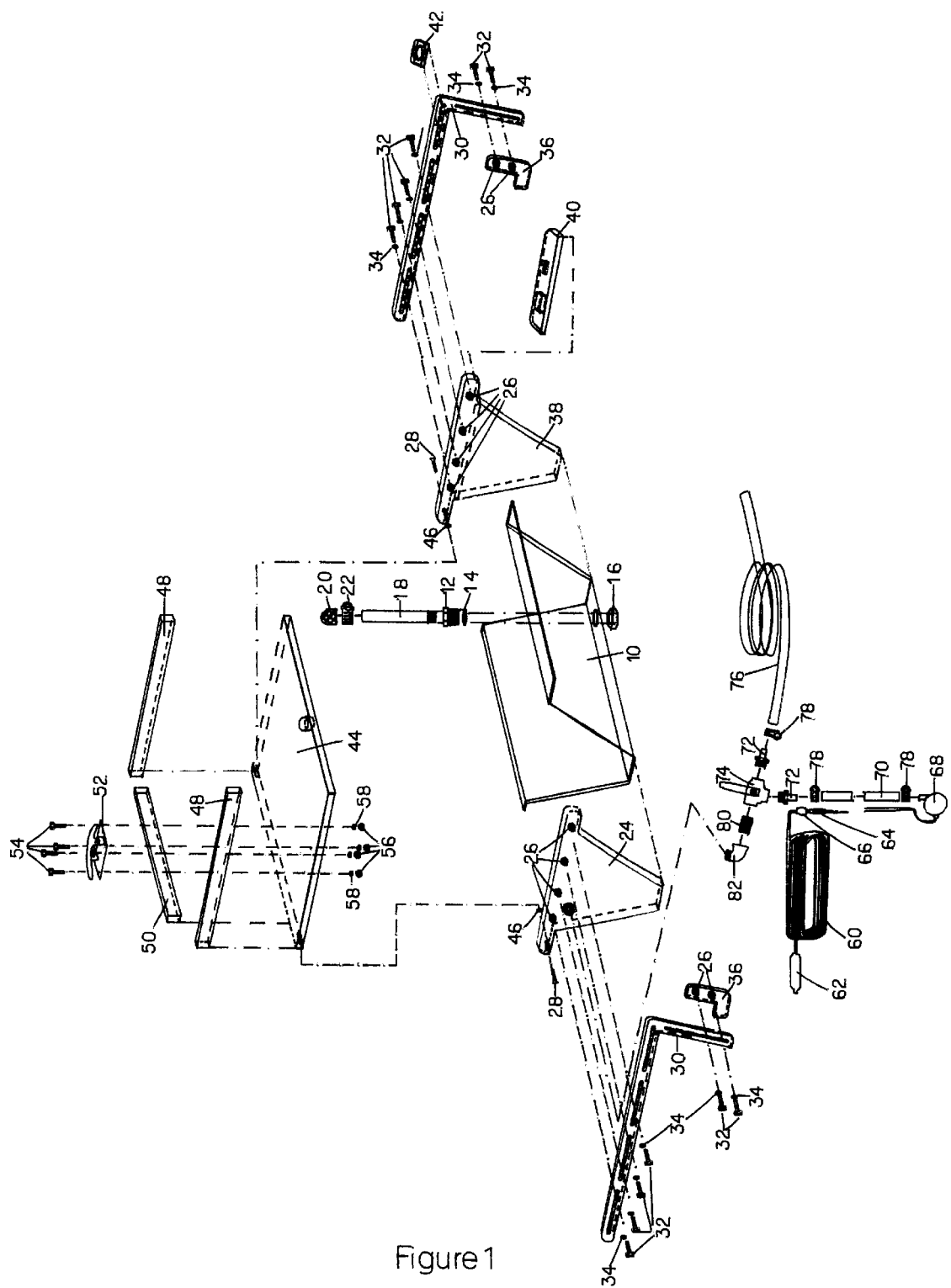
FIG. 1 is a Isometric View of Entire Invention
Figure 4:
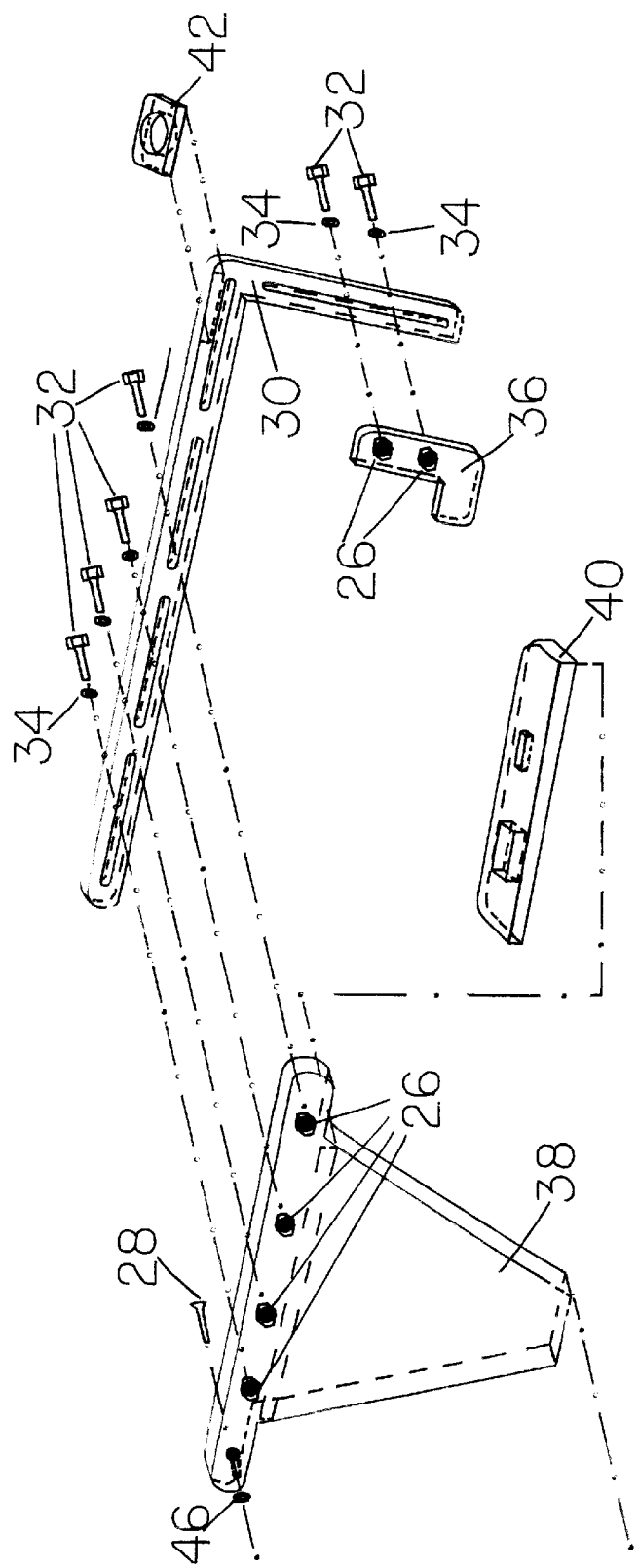
FIG. 4 is a Isometric Exploded View of Right End Assembly
Figure 10:
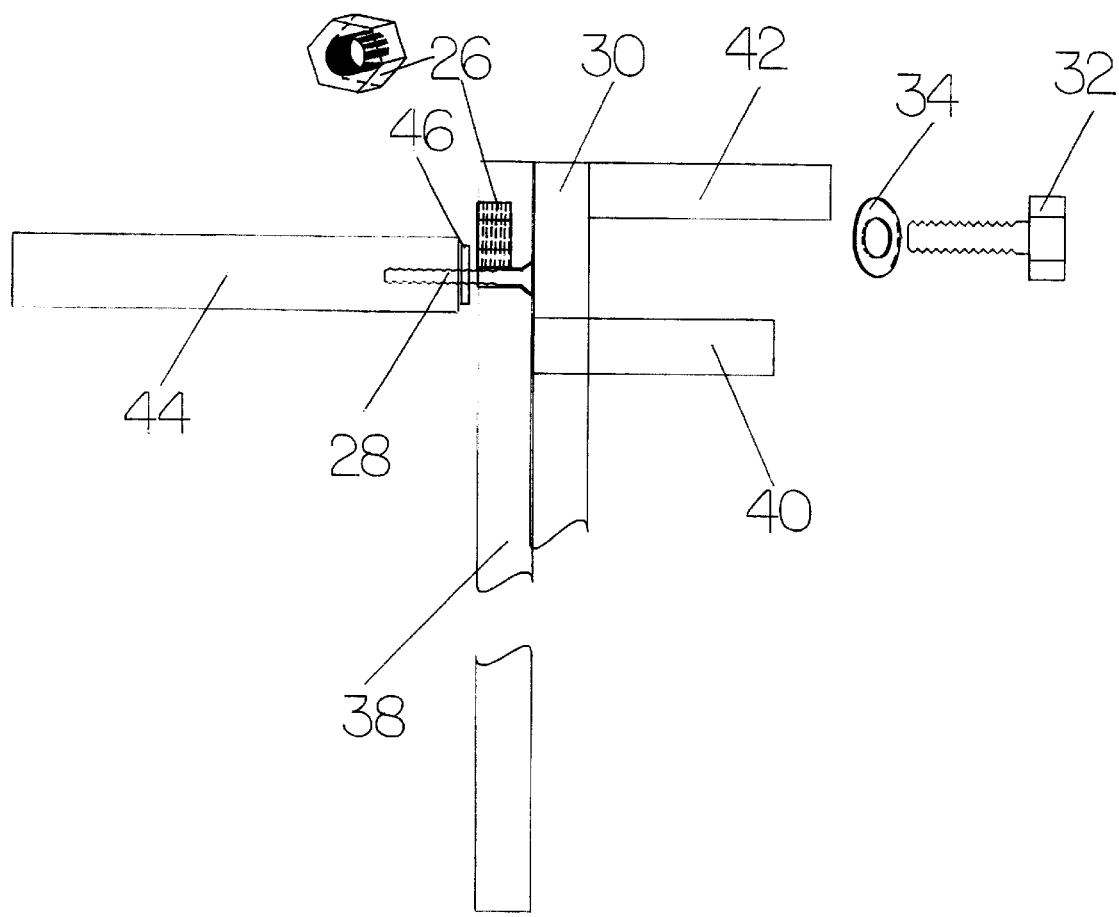
FIG. 10 is a Exploded View of Right End Assembly
Figure 11:
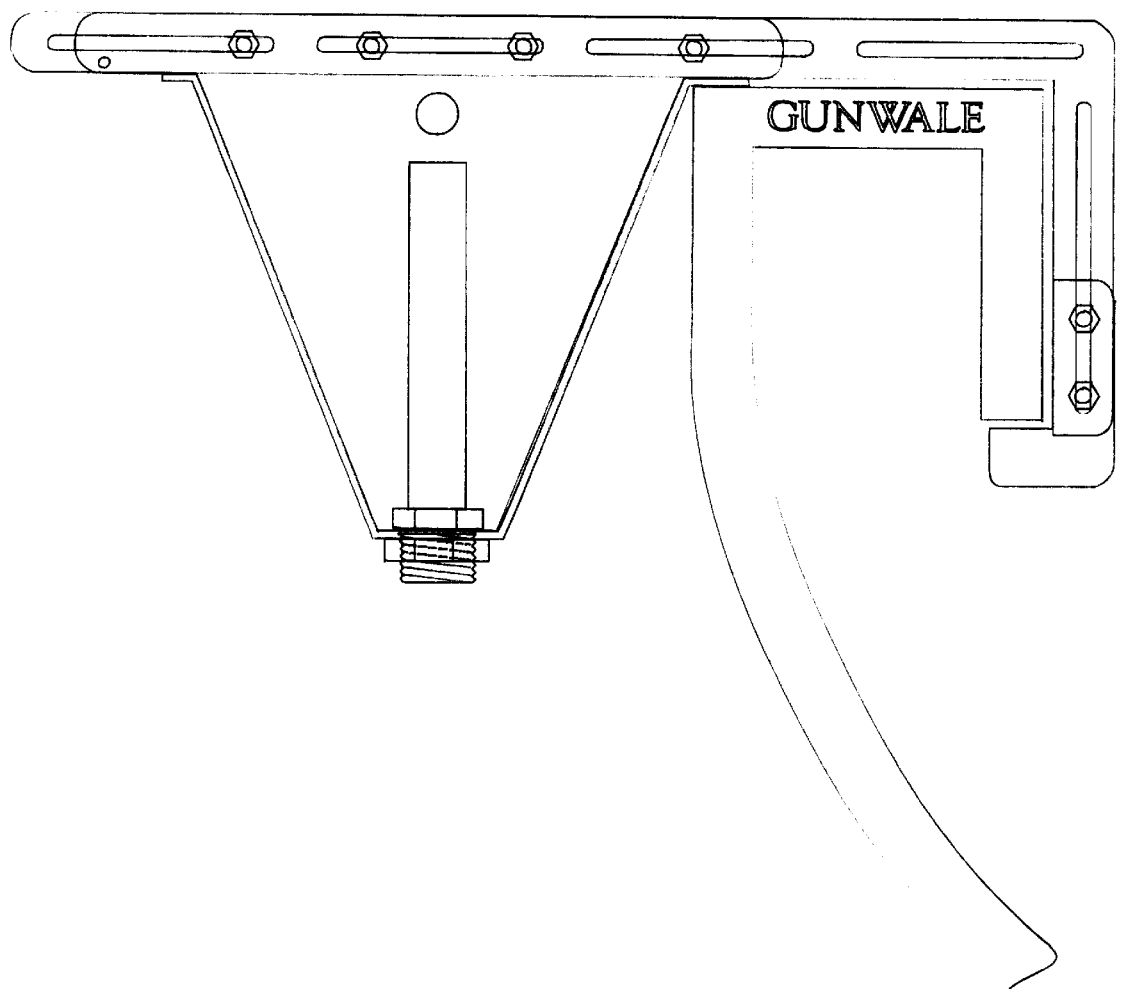
FIG. 11 shows How This Invention is Mounted on the Gunwale of a Boat

A right end polycarbonate plastic 38, FIG. 4 is ⅜" polycarbonate plastic is glued to main "V" shaped tank 10, FIG. 1. Mounting of upper and lower portion of adjustable mounting arm 30, & 36, FIG. 4 is the same as left end only the nuts, bolts and washers are reversed. A polycarbonate plastic knife and pliers holder 40, FIG. 4 is made of ⅜" polycarbonate plastic is glued to right end polycarbonate plastic 38, FIG. 10 just below the adjustable mounting arm 30. A polycarbonate plastic garbage bag holder 42 is made of ⅜" polycarbonate plastic and is glued to the upper portion of the adjustable mounting arm 30, FIG. 10 toward the forward end just before the arm turns downward.

Figure 5:
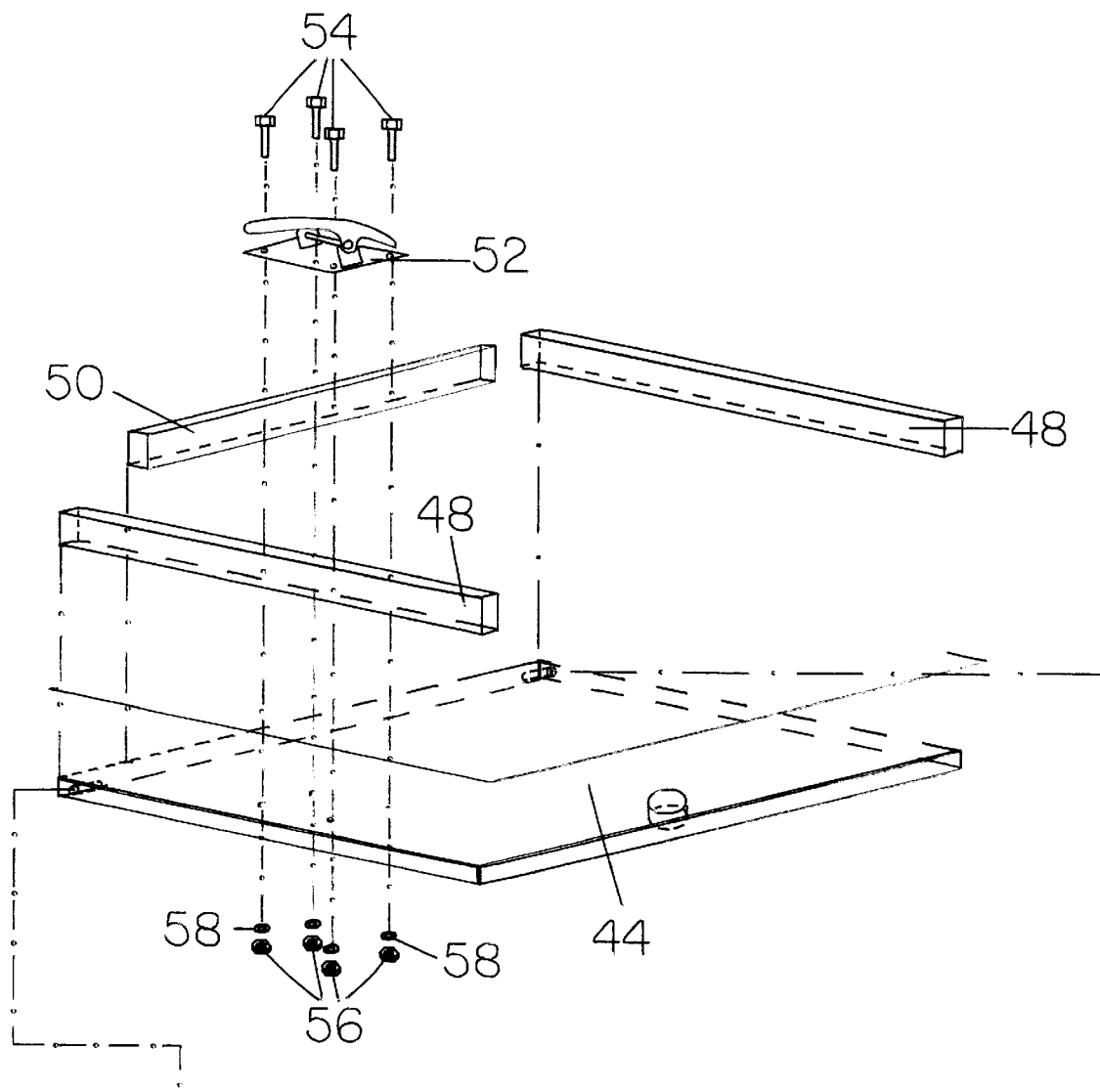
FIG. 5 is a Isometric Exploded View of Fish Cleaning and Bait Cutting Board

A cutting board high density polyethylene plastic 44, FIG. 5 is attached to both ends 24, & 38, FIG. 1 and to the "V" shaped tank 10, FIG. 1 with two ⅛"×1" flat head stainless steel machine screw 28, FIG. 1. These machine screws are threaded into the cutting board high density polyethylene plastic 44, FIG. 5. A ⅛" stainless steel washer 46, FIG. 1 is placed between the end piece 24, & 38 and cutting board high density polyethylene plastic 44, FIG. 1.

A 1"×10½"×½" high density polyethylene plastic 48, FIG. 5 is glued to both edges left and right of cutting board high density polyethylene plastic 44, FIG. 5. A 1"×16"×½" high density polyethylene plastic 50, FIG. 2 is glued to the rear of cutting board high density polyethylene plastic 44, FIG. 5 and centered from left to right.

A clamping device 52, FIG. 5 is a metal clamp attached to cutting board high density polyethylene plastic 44 with four ⅛"×¾" round head stainless steel machine screws 54, FIG. 5. A ⅛" stainless steel nut 56 and ⅛" stainless steel washer 58. The clamp is centered on cutting board high density polyethylene plastic 44 on left side. A 10' electrical cord 60, FIG. 6 with a cigarette lighter adapter 62 or alligator clips and an inline fuse 64 and inline switch 66 is attached to a 12 volt submersible pump 68. Pump 68 is attached to a ½" clear vinyl hose 70 long enough to reach from the gunwale of the boat to six inches below water line. A ½" slip×½" MIP polyetheylene adapter 72, FIG. 6 is attached to ½" 3 way brass ball valve 74, FIG. 6 on the inlet side. A ½" slip×½" MIP polyethylene adapter 72 is attached to ½" clear vinyl plastic hose 76 which is used as a wash down hose; the other end of adapter 72 is connected to one of the outlets of the 3 way brass ball valve 74. Both hoses 70, and 76, FIG. 6 are secured with ½" stainless steel hose clamps 78.

A ½" close galvanized nipple 80, FIG. 6 is attached to opposite end of the brass ball valve 74. A ½" galvanized street ell 82 is attached to ½" close nipple 80 and then attached to "V" tank end 24, FIG. 1.

PREFERRED EMBODIMENT

Opwration

This device consists of a fish cleaning table, bait cutting table, and a live well tank.

The device is attached to the gunwale of a boat by loosening stainless steel bolts 32 on all parts of the adjustable mounting arms. Place this device over the gunwale and slide the upper portion of adjustable mounting arm 30 up next to the gunwale and tighten four stainless steel bolts 32 in end plates 24 and 38 of tank. Next slide lower portion of adjustable mounting arm 36 up to the bottom lip of gunwale and tighten the two bolts 32. This will firmly install the device to the boat.

Lower submersible pump 68 into the water, approximately 6" below water line. Next plug in cigarette lighter 62 or attach to a 12 volt battery with aligator clips. This device is now ready for use.

First possible use of this device is as a fish cleaning table 44. To use the table, attach fish to clamp 52 or just place fish on table to clean. If fishing in a lake or resevoir where it is prohibited to dump entrails back in the water, insert the upper corner of a garbage bag it through the holder 42 and tie a half hitch knot. If you wish, the fish can be washed off first by turning inline switch 66 on and wash with washdown hose 76. While pump is running, the hose may be placed in finger hole of cutting board 76 while cleaning if water is not needed inline switch 66 may be turned off. Fish to be cleaned or fish already cleaned can be placed in "V" tank 10 for storage.

The second use of this device is a bait cutting station where bait can be prepared for fishing. Usually this process can create a mess and rather than inside a boat, this device hangs outside of the boat next to the gunwale. When fishing with night crawlers, this also can be messy so they may be stored in the "V" shaped tank 10 with ice to keep them fresh. Water can be supplied from the lake or reservoir by use of pump 68 to wash cutting board 44 or to wash hands.

The third use is a live well. Once the boat is launched fill the "V" shaped tank 10 with water from pump 68 and place live bait in water.

There are several things a boat operator should remember: (1) When boat is in motion, pump 68 should be placed inside the boat, (2) This device should not be attached to the gunwale in very rough water, i.e., 3' to 4' waves.

CONCLUSIONS, RAMIFICATIONS, AND SCOPE

Accordingly, it can be seen that this device is not limited to shape, length, height, width or types of materials used. There are many different shapes of boats. By use of the adjustable mounting arms of this device, this device can be mounted to a large variety of boats. This device does not require brackets, flanges or other devices connected to the boat.

The main advantage to this device is that it is a 3 in 1 multi purpose device. The first purpose is as a fish cleaning table mounted on a boat with running water and garbage bag holder to place entrails after cleaning fish. The second part of the 3 in 1 device is that it provides a bait cutting station, a place to prepare bait for fishing. The third of the 3 in 1 is it provides a live well for the transportation of live bait such as minnows. It can also be used to store fish for cleaning and/or store fish after cleaning. This device also provides a convient place to wash hands with running water.

Although the description above contains many specificities, these should not be construed as limiting the scope of the device but as merely providing illustrations of some of the presently preferred embodiments of this device. Various other embodiments and ramifications are possible within it's scope. For example, the wash down hose could be used to extinguish a fire aboard a boat if fire extinguishers failed to completely finish the task.

The cutting board preferred material is high density polyethylene plastic. It is commonly used for cutting boards and can be easily cleaned to prevent contamination of germs, etc. Wood or other products may also be used.

Thus the scope of the device should be determined by the appended claims and their legal equivalents, rather than by the examples given.

What is claimed is:

1. A protable, boat mounted fish cleaning, bait cutting, and live well device comprising:
    a rectangular cutting board having a knife and pliers holder, and a clamping device; an elongated "V" shaped tank having water inlet and overflow tubes attached thereto; a submersible 12 volt centrifugal pump and a 3 way brass ball valve attached to said tank; a wash down hose connected to a port of said valve; said rectangular cutting board being connected to said tank; and adjustable arms for attaching said tank to the gunwale of a boat.

2. The rectangular cutting board in claim 1 is rectangular in shape and made of high density polyethylene attached to ends of the elongated "V" shaped tank with a screw on each end which serves as a pivot point and the cutting board becomes a lid for the live well tank.

3. The rectangular cutting board in claim 2 has a vertical lip attached on both ends and outer edge to provide a means of not allowing fish or entrails to escape.

4. The rectangular cutting board in claim 2 has a clamping device attached to one end of the work area to hold fish while cleaning.

5. The elongated "V" shaped tank in claim 1 comprising of a elongated "V" shaped tank with a flat bottom, ends, a lip on the front and back at the upper most part of the "V" shape forming a tank for the live well.

6. The knife and pliers holder in claim 1 is attached to the opposite end of the elongated "V" tank from the water inlet and provides a convenient and safe place to store them.

7. The 3 way brass ball valve in claim 1 is attached to one end of the elongated "V" tank and controls the water flow from the pump to either the wash down hose or the live well tank.

8. The wash down hose of claim 5 is attached to one of the 3 way brass valve outlets ports and used for cleaning purpose.

9. The pump in claim 1 consisting of a submersible centrifugal pump attached to a polyethylene hose of various lengths and the other end of hose is connected to the input port of the 3 way brass ball valve.

* * * * *